United States Patent [19]

Lundberg et al.

[11] Patent Number: 4,536,547

[45] Date of Patent: Aug. 20, 1985

[54] POLYMER COMPLEXES OF A NEUTRALIZED IONIC POLYMER AND A POLYCAPROLACTONE POLYMER

[75] Inventors: Robert D. Lundberg, Bridgewater; Robert R. Phillips, Spring Lake Heights, both of N.J.

[73] Assignee: Exxon Research and Engineering Co., Florham Park, N.J.

[21] Appl. No.: 566,347

[22] Filed: Dec. 28, 1983

[51] Int. Cl.³ .................. C08L 51/04; C08L 51/08; C08L 51/00

[52] U.S. Cl. .................. 525/186; 525/190; 525/331.8

[58] Field of Search .............. 525/331.8, 186, 190

[56] References Cited

U.S. PATENT DOCUMENTS

| | | | |
|---|---|---|---|
| 3,642,728 | 2/1972 | Canter | 525/341 |
| 3,836,511 | 9/1974 | O'Farrell et al. | 525/344 |
| 3,974,241 | 8/1976 | Lundberg et al. | 525/186 |
| 4,131,586 | 12/1978 | Makowski et al. | 525/331.8 |
| 4,379,914 | 4/1983 | Lundberg | 525/190 |
| 4,421,898 | 12/1983 | Lundberg et al. | 525/190 |

*Primary Examiner*—Y. Harris-Smith
*Attorney, Agent, or Firm*—Richard E. Nanfeldt

[57] ABSTRACT

This invention relates to unique and novel polymer complexes between a metal neutralized sulfonated polymer and a tertiary amine terminated polylactone composition. The resulting polymer complexes have a variety of uses including those as diverse as adhesive agents, thermoplastic elastomers, additive uses wherein these materials can be utilized to compatibilize two different polymers which are normally incompatible. These polymer complexes can also be blended with fillers and/or oils when the sulfonated polymer is elastomeric. The materials display thermoplastic character.

17 Claims, No Drawings

POLYMER COMPLEXES OF A NEUTRALIZED IONIC POLYMER AND A POLYCAPROLACTONE POLYMER

FIELD OF THE INVENTION

This invention relates to unique and novel polymer complexes of a metal neutralized sulfonated polymer and an amine terminated polylactone composition. The resulting polymer complex of the amine terminated polylactone and the metal neutralized sulfonated polymer have a variety of uses including those as diverse as adhesive agents, thermoplastic elastomers, additive uses wherein these materials can be utilized to compatibilize two different polymers which are normally incompatible. These compositions can also be blended with fillers and/or oils when the sulfonated polymer is elastomeric. These materials display thermoplastic character.

BACKGROUND OF THE INVENTION

Recently, a new class of thermoelastic sulfonated polymers has been described in a number of U.S. Patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer at room temperature. However, these ionically cross-linked elastomers may be processed like a conventional thermoplastic at elevated temperatures under a shear force in the presence of selected preferential plasticizers, which dissipate the ionic associations at the elevated temperatures, thereby causing a reprocessable elastomer.

The basic materials used as neutralizing agents are selected from organic amines or basic materials selected from Groups I, II, III, IV, V, VI-B and VIII, and mixtures thereof, of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonated groups at a temperature of forming.

U.S. Pat. No. 3,847,854, herein incorporated by reference, teaches a method of improving the processability of a neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer.

The instant invention differs from U.S. Ser. No. 332,850 in that the polymeric compositions of U.S. Ser. No. 332,850 involve the neutralization of an unneutralized sulfonated polymer with an amine terminated polycaprolactone to form an amine neutralized sulfonated polymer. The polymer complexes of the instant invention are not formed by an acid base interaction as in U.S. Ser. No. 332,850 but rather the amine terminated polycaprolactone is complexed by means of coordinate bonds with the metal neutralized sulfonated polymer.

SUMMARY OF THE INVENTION

Sulfonated polymers have been shown to display many of the characteristics of a covalently cross-linked elastomer of plastic despite the fact that these materials would be especially useful to employ in blend compositions with a variety of other polymers such as polyvinyl chloride, polyurethanes, polystyrene, "Phenoxy A", polyethylene and similar compositions. However, sulfonated polymers are usually incompatible with such compositions except under unusual circumstances.

This invention is concerned with a new class of polymer complexes based upon the coordinating bonds between a metal neutralized sulfonated polymers and an amine terminated polylactone. As such, these polymers can have many of the physical properties of the base sulfonated polymer (such as Sulfo EPDM) but also derive many of the desirable features of the polylactone (such as poly-ε-caprolactone). Generally, the sulfonated polymer and the lactone polymer are not truly molecularly compatible and; therefore, are phase separated. Due to the fact that the sulfonated polymer is chemically combined with a novel class of amine terminated lactones, the resulting grafted polymer system displays some properties of both polymer phases.

Since the polylactones, such as poly-ε-caprolactone, are widely known for their unique compatibility behavior, this invention permits the preparation of polylactone neutralized sulfonated polymers which are useful in a variety of polymer blends. In the case where Sulfo EPDM is the base sulfonated polymer, the combination with amine-terminated poly-ε-caprolactone provides a polymer complex system which can behave as a tough and useful thermoplastic elastomer. Such compositions derive their physical properties, in part from the ionic interactions but mostly due to the crystalline caprolactone domains which act as physical cross-links. Such systems can also be modified through the addition of oils and fillers, as in the case for other sulfonated elastomers. The resulting materials can, under appropriate conditions, be melt processable.

This invention relates to unique and novel polymer complexes based on coordinating bonds between a neutralized sulfonated polymer and a tertiary amine terminated polylactone composition. The resulting polymer complexes of the terminated polycaprolactone and the metal neutralized sulfonated polymer compositions have a variety of uses including those as diverse as adhesive agents, thermoplastic elastomers, additive uses wherein these materials can be utilized to compatibilize two different polymers which are normally incompatible. These compositions can also be blended with fillers and/or oils when the sulfonated polymer is elastomeric. The materials display thermoplastic character.

The neutralized sulfonated elastomeric polymers of this present invention are derived from elastomeric or plastic polymers wherein the elastomeric polymers are derived from unsaturated polymers which include low unsaturated elastomeric polymers such as Butyl rubbers or EPDM terpolymers.

Alternatively, other unsaturated polymers are selected from the group consisting of partially hydrogenated polyisoprenes, partially hydrogenated polybutadienes, Neoprene, styrene-butadiene copolymers or isoprenestyrene random copolymers.

The expression "Butyl rubber" as employed in the specification and claims, is intended to include copolymers made from a polymerization reaction mixture having therein from 70 to 99.5% by weight of an isoolefin which has about 4 to 7 carbon atoms, e.g., isobutylene and about 0.5 to 30% by weight of a conjugated multiolefin having from about 4 to 14 carbon atoms, e.g., isoprene. The resulting copolymer contains 85 to 99.8% by weight of combined isoolefin and 0.2 to 15% of combined multiolefin.

Butyl rubber generally has a Staudinger molecular weight as measured by GPC of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purpose of this invention, the Butyl rubber may have incorporated therein from about 0.2 to 10% of combined multiolefin; preferably about 0.5 to about 6%; more preferably, about 1 to about 4% e.g., 2%.

Illustrative of such a Butyl rubber is Exxon Butyl 365 (Exxon Chemical Co.), having a mole percent unsaturation of about 2.0% and a Mooney viscosity (ML, 1+3, 212° F.) of about 40–50.

Low molecular weight Butyl rubbers, i.e., Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt% olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt% ethylene and about 1 to about 10 wt% of a diene monomer, the balance of the polymer being propylene. Preferably, the polymer contains about 45 to about 70 wt% ethylene, e.g., 50 wt% and about 2.6 to about 8.0 wt% diene monomer, e.g., 5.0 wt%. The diene monomer is preferably a nonconjugated diene.

Illustrative of these nonconjugated diene monomers which may be used in the terpolymer (EPDM) are 1,4-hyxadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.,) a terpolymer having a Mooney viscosity (ML, 1+8, 212° F.) of about 40 and having an ethylene content of about 50 wt%. The Mn as measured by GPC of Vistalon 2504 is about 47,000, the Mv as measured by GPC is about 145,000 and the Mw as measured by GPC is about 125,000.

Nordel 1320 (DuPont) is another terpolymer having a Mooney viscosity at 212° F. of about 25 and having about 53 wt % of ethylene, about 2.5 wt% of 1,4-hexadiene, and about 43.5 wt% of propylene.

The EPDM terpolymers of this invention have a number average molecular weight (Mn) as measured by GPC of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The Mv as measured by GPC of the EPDMA terpolymer is preferably below about 350,000 and more preferably below about 300,000. The Mw as measured by GPC of the EPDM terpolymer is preferably below about 500,000 and more preferably below about 350,000.

The neutralized sulfonated thermoplastic polymers of the instant invention are derived from polystyrene type thermoplastics polymers which are selected from the group consisting of polystyrene, poly-t-butyl-styrene, polychlorostyrene, polyalph methyl styrene and co- or terpolymers of the aforementioned with acrylonitrile or vinyl toluene.

The polystyrene thermoplastics suitable for use in the practice of the invention have a glass transition temperature from about 90° C. to about 150° C., more preferably about 90° C. to about 140° C. and most preferably about 90° C. to about 120° C. These polystyrene resins have a weight average molecular weight as measured by GPC of about 5,000 to about 500,000 more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexus modulus 10,000 psi) material capable of retaining the ability to flow at elevated temperatures for relatively long times.

The preferred polystyrene thermoplastic resin is a homopolymer of styrene having a number average molecular weight of about 180,000, and an intrinsic viscosity in toluene of about 0.8. These polymers are widely available commercially in large volume. A suitable material is Styron 666 which affords a number molecular weight of about 105,000.

In carrying out the invention, the polymer is dissolved in a nonreactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the elastomeric polymer and nonreactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,835,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are SO₃, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acylsulfate can be formed in situ in the reaction medium or regenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated elastomeric polymer has about 3 to about 200 meq unneutralized sulfonate groups per 100 grams of sulfonated polymer, more preferably about 15 to about 100; and most preferably about 20 to about 80. The meq of unneutralized sulfonate groups per 100 grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The unneutralized form is titrated with ethanolic sodium hydroxide to an Alizarin-Thymolphthalein endpoint.

The unneutralized sulfonated polymer is gel free and hydroltyically stable. Gel is measured by stirring a given weight of polymer in a solvent comprised of 95 toluene-5-methanol at a concentration of 5 wt%, for 24 hours, allowing the mixture to settle, withdrawing a weighted sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

The unneutralized sulfonate groups of the unneutralized sulfonated polymers of the instant invention are neutralized with a metal counterion selected from the Group consisting of Group IA, IB, IIA and IIB of the Periodic Table of Elements, wherein a zinc counterion is preferred. Either metallic salts of carboxylic acids having about 2 to about 20 carbon atoms or metallic hydroxides can be used in the solution of bulk state as effective neutralizing agents.

A solution of the metal neutralized sulfonated polymer is complexed with the polycaprolactone polymer in the bulk state in an intensive mixer. These polycaprolactone polymers are formed by the reaction of ε-caprolactone with an organic diamine in the presence of a catalyst as described in an issued U.S. Pat. No. (4,379,914). The anhydrous ε-caprolactone and the organic diamine in the presence of the catalyst are reacted together in a reaction vessel in the absence of a solvent at a temperature of about 50° to about 200° C., more preferably about 75° to about 180° and most preferably about 90° to about 100° C. for a sufficient period of time to effect polymerization.

The reaction of the ε-caprolactone with the diamine can be generally depicted by the equation.

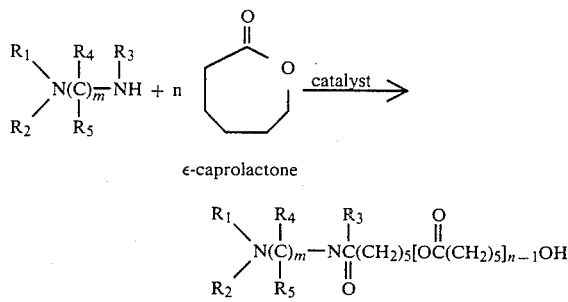

wherein n=1 to 500, m=1 to 20, R₁ or R₂ are selected from the group consisting of alkyl, heterocyclic, cycloalkyl and aromatic groups having about 1 to about 20 carbon atoms, more preferably about 1 to about 12 carbon atoms, and aryl groups, and R₃ is selected from the group consisting of hydrogen, alkyl and cycloalkyl groups having about 1 to about 20 carbon atoms, more preferably about 1 to about 12, and aryl groups and R₄ and R₅ are hydrogen, alkyl, cycloalkyl or aryl groups. Typical, but nonlimiting, examples of useful diamines are:

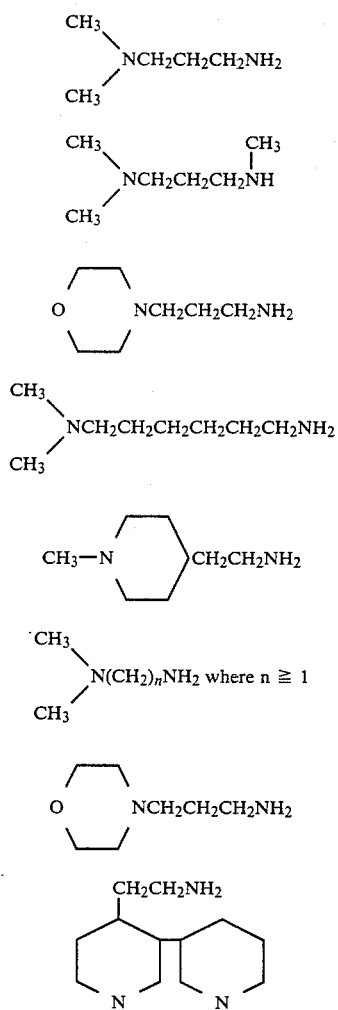

-continued

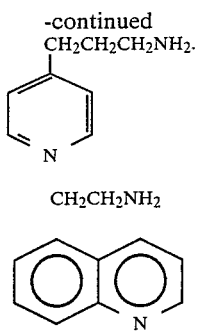

Catalysts useful in the promotion of the above identified reaction are selected from the group consisting of stannous octanoate, stannous hexanoate, stannous oxalate, tetrabutyl titanate, a variety of metal organic based catalysts, acid catalysts and amine catalysts, as described on page 266, and forwarded in a book chapter authored by R. D. Lundberg and E. F. Cox, entitled *Kinetics and Mechanisms of Polymerization: Ring Opening Polymerization;* edited by Frisch and Rugen, published by Marcell Dekker in 1969, wherein Stannous octanoate is an especially preferred catalyst. The catalyst is added to the reaction mixture at a concentration level of about 100 to about 10,000 parts of catalyst per 1 million parts of ϵ-caprolactone.

The resultant polycaprolactone polymer has an Mn as measured by GPC of about 200 to about 50,000 more preferably about 500 to about 40,000, and most preferably about 700 to about 30,000 and a melting point from below room temperature to about 55° C., more preferably about 20° C. to about 52° C., and most preferably about 20° C. to about 50° C.

The polymer complex of the metal neutralized sulfonated polymer and the amine terminated polycaprolactone at higher sulfonate levels possess high melt viscosities and can be difficult to process. The addition of ionic group plasticizers markedly reduces melt viscosity and frequently enhances physical properties.

To the neutralized sulfonated polymer is added, in either solution or to the crumb of the unneutralized form of the sulfonated polymer, a preferential plasticizer selected from the group consisting of carboxylic acids having about 5 to about 30 carbon atoms, more preferably about 8 to about 22 carbon atoms, or basic salts of these carboxylic acids, wherein the metal ion of the basic salt is selected from the group consisting of aluminum, ammonium, lead of Groups IA, IIA, IB and IIB of the Periodic Table of Elements, and mixtures thereof. The carboxylic acids are selected from the group consisting of lauric, myristic, palmitic or stearic acids and mixtures thereof; e.g., zinc stearate, magnesium stearate, or zinc laurate.

The preferential plasticizer is incorporated into the polymer complex at less than about 60 parts by weight per 100 parts of the polymer complex more preferably at about 5 to about 40, and most preferably at about 7 to about 25. Alternatively, other preferential plasticizers are selected from ureas, thioureas, amines, amides, ammonium and amine salts of carboxylic acids and mixtures thereof. The resultant neutralized sulfonated polymer with preferential plasticizer is isolated from the solution by conventional steam stripping and filtration.

Various other additives can be incorporated into the blend compositions to improve the physical properties, the appearance, the chemical properties of the formed elastomeric article or to modify the processability of the blend compositions.

A crystalline polyolefinic thermoplastic can be incorporated into the blend composition in minor proportions as a means for modification of the rheological properties of the blend compositions as well as the stiffness of the elastomeric article. Typically, the crystalline polyolefinic thermoplastic is added to the blend composition at a concentration level of less than about 100 parts by weight per 100 parts of polymer complex, more preferably at about 1 to about 75; and most preferably at about 1 to about 50.

A lubricant can be employed in the blend compositions at a concentration level of less than about 20 parts by weight per 100 parts of the polymer complex, and more preferably about 1 to about 15. The lubricants of the present instant invention are non-polar paraffinic hydrocarbon waxes having a softening point of about 135° F. to about 220° F., more preferably 150° F. to 200° F., wherein the wax has a number average molecular weight of about 1000 to about 4000, more preferably 1500 to 3500, and less than about 2 wt% polar constituents. These lubricants modify the rheological properties of the composition, improve the processability in forming the elastomeric article and impart a shine or gloss to the elastomeric article. Additionally, amorphous polypropylene can be used as a lubricant.

The ingredients incorporated into the blend compositions of the present invention, in conjunction with the type of polymer, the degree of sulfonation, and the metal counterion of the neutralized sulfonated polymer and the plasticizer give materials processable by extrusion or injection molding processes into elastomeric articles having the desirable physical and rheological properties.

The polymer composition prepared according to this invention cover a variety of new systems and applications. For example, a metal neutralized sulfonated polymer complexed with a tertiary amine terminated poly-ϵ-caprolactone can possess a variety of properties depending on sulfonate content and poly-ϵ-caprolactone (or PCL) molecular weight. Thus, a high molecular weight PCL (For example, a number average molecular weight of 10,000) complexed with a metal neutralized sulfonated EPDM terpolymer of 30 milliequivalents per 100 grams sulfonic acid content would require about 300 grams of PCL per 100 grams of Sulfo EPDM to effect complexing. Such a composition, therefore, would be about 75 percent PCL. On the other hand, the use of a PCL polymer of 1,000 molecular weight would result in a polymer complex of about 23 percent PCL. The physical properties of these two compositions will obviously vary substantially, depending on the compositions.

Similarly, metal neutralized sulfonated polystyrene (S-PS) can be complexed with PCL. In this case, polystyrene can be sulfonated over a range of sulfonate content from as little as 1 mole percent up to about 100 mole percent. In the former case, only 1 of every 100 repeat units contains sulfonate groups, while in the latter case, every aromatic group is sulfonated. Obviously, the range of complexes available, depending on the PCL molecular weight or the sulfonate content, is extremely large. The variation in physical properties available, similarly, is large.

The application to which these novel polymer complexes can be put to use is varied such as thermoplastic elastomers and potential adhesives.

Other types of polymer sulfonates suitable in this invention include sulfonated polybutadiene, sulfonated polyisoprene, sulfonated Butyl, sulfonated SBR, sulfonated polypentenomer, etc. Of special interest are polymers with terminal unsaturation such as polyisobutylene. Typically, this polymer is terminated with an olefin group which can be sulfonated to provide a long chain polyisobutylene of from 500 to 25,000 in molecular weight. Sulfonation of this functionality provides a polymer with a sulfonate group at just one end, and which can then be complexed to provide a polyisobutylene/PCL complex composed of just two blocks.

The sulfonated aromatic polymers can be of special use as potential compatibilizers or adhesives between polymers which do not normally adhere or blend to form compatible blends. Examples of such polymers are Butyl rubber and polyvinyl chloride of polyisobutylene and polyester-based polyurethanes.

The potential list of polymers which can be adhered or blended together by the use of these concepts is extensive and will be summarized only briefly in this application. Obviously, the list of polymers suitable for such uses will depend on the particular PCL/Sulfonated polymer considered. The following list is intended to represent combined systems for several types of such grafts, as indicated.

TABLE I
COMPATIBILITY TABLE FOR SULFO POLYSTYRENE/PCL GRAFTS

| Column A<br>Polymer Phase<br>Compatible with Polystyrene | Column B<br>Polymer Phase<br>Compatible with PCL |
| --- | --- |
| Polystyrene | Polyvinyl Chloride |
| Rubber toughened polystyrene (impact modified) | Nitrocellulose<br>Low density polyethylene |
| Acrylonitrile/butadiene/styrene Terpolymer (ABS resin) | Phenoxy A<br>Polyvinyl butyral |
| Sytrene/acrylonitrile | Polyester based urethanes |
| Styrene/methylmethacrylate copolymers | Vinyl chloride/vinylidene chloride copolymers |

DETAILED DESCRIPTION OF THE INVENTION

The advantages of the polymer complexes of the instant invention can be more readily appreciated by reference to the following Examples and Tables:

EXAMPLE 1

Preparation of Zinc Neutralized Sulfonated Ethylene-Propylene Terpolymer.

In 500 ml of hexane 500 g of EPDM containing about 50 wt% ethylene and about 5 wt% 5-ethylidene-2-norbornene and having a Mooney Viscosity (ML, 1+8, 212° F.) of about 20 was dissolved and 200 m moles of aceptic anhydride was added followed by 125 m moles of concentrated sulfuric acid. After 30 minutes of reaction at room temperature the sulfonation was quenched with 500 ml of methanol. Then the sulfonated cement was neutralized with a solution of zinc acetate corresponding to 40 milliequivalents of zinc acetate per 100 g of polymer in 125 ml of water. Antioxidant 2246 (2.5 g) was added and the cement stirred for 30 minutes. The cement was steam stripped to isolate a polymer crumb which was subsequently dried.

EXAMPLE 2

Preparation of Zinc Neutralized Sulfonated Polystyrene.

In 500 ml of 1,2 dichloroethane dissolved 100 g of polystyrene (Dow Styron 666) at 50° C. To this solution stirring at 50° C., added 7.4 g (73 m moles) acetic anhydride and 4.6 g (45 m moles) concentrated sulfuric acid. The reaction mixture was stirred at 50° C. for 1 hour and the sulfonation terminated by adding 25 ml of methanol. The sulfonated polystyrene (acid form) was recovered by steam stripping the reaction mixture followed by washing and pulverizing in water with a waring blender. The product was then filtered, air dried and then dried in an Aeromatic dryer at 80° C. The dry sulfonated polystyrene acid was dissolved in 1000 ml of dichloroethane and a solution of 3.4 g zinc acetate in 10 ml water and 10 ml methanol added. After stirring one hour, the solution became cloudy and thicker. After stirring four hours, the zinc neutralized sulfonated polystyrene was recovered by precipitating in excess methanol. The product was air dried and then vacuum oven dried at 60° C.

EXAMPLE 3

Preparation of Poly-ε-caprolactone Amine.

Poly-ε-caprolactone amine with a molecular weight of about 2000 was prepared in the following manner. To 97.1 ml of distilled ε-caprolactone was added 6.5 ml of 3-dimethyl amino propyl amine and 0.25 ml of stannous octoate and stirred. Temperature was increased over a period of 2 hours to 150° C. during which time the color of the solution became a dark reddish-black. The reaction mixture was stirred and heated at 150°–155° C. for three hours during which time it gradually thickened. At the end of this period, the reaction mixture was poured into a teflon boat and cooled. The product solidified to a hard tan wax. Preparation of poly ε-caprolactone adducts of various molecular weights can be prepared by varying the amount of 3-dimethyl amino propyl amine charged to the reaction.

EXAMPLE 4

A complex was obtained by blending a tertiary amine terminated ε-caprolactone of about 3000 in molecular weight with a zinc sulfonated ethylene propylene terpolymer having a Sulfonate level of 20 milliequivalents/100 gms of polymer. Such complexes can be prepared by mixing in an intensive mixer such as a Brabender or a laboratory two-roll mill. For comparison of the importance of specific interacting groups a polycaprolatone of low molecular weight (10,000), but without free amine groups was employed.

Several levels of poly-ε-caprolactone were employed as shown in Table 1. The resulting products demonstrated immediately the difference in the polymer blends. The composition in which the PCL was terminated by amine groups exhibited greatly different properties from the blend in which the PCL did not contain amine. Clearly the amine containing system was clearer, did not display an exudate, and was softer and exhibited greater elongation.

In addition, the solubility behavior of these two classes of materials, in a hydrocarbon such as heptane was markedly different. This behavior is shown in Table (1). For example, zinc sulfo EPDM alone at a sulfonate level of 20 meq/100 gms is not fully soluble in xylene—indeed it forms a strong gel due to substantial ionic associations. The amine terminated polycaprolactone is not soluble. Surprisingly, the combination of these two polymers in that solvent provides a solubilization of both components with a resulting viscosity which is quite low.

Clearly these results are contrasted with the blend of sulfo EPDM and the PCL 300 (without amine). These results shown unambiguously that the combination of amine terminated polymer and the metal sulfonated polymer interact strongly and unexpectedly to change the solution properties of both components.

TABLE 1

Blends of Sulfo-EPDM with Poly-Caprolactone Amine (PCLA) and Poly Caprolactone (PCL 300)

| Zinc Sulfo-EPDM | Grams Sulfo-EPDM | Poly-* Capro Lactone | Grams PCL | Solubility in Heptane at 2% | Stress - Strain PSI at Elongation, T | | | | Break | |
|---|---|---|---|---|---|---|---|---|---|---|
| | | | | | 100% | 300% | 500% | 700% | Tensile | Elongation |
| TP319 (20 meq) | 5 | PCL-A | 0.75 | Gelled Mass | 180 | 326 | 705 | 1940 | 3050 | 750 |
| " | 5 | " | 1.5 | Thick, Cloudy Solution | 78 | 113 | 155 | 205 | 275 | 1000+ |
| " | 5 | " | 2.25 | Thick, Cloudy Solution | 110 | 138 | 168 | 217 | 250 | 840 |
| TP319 (10 meq) | 5 | " | 0.375 | — | 111 | 140 | 170 | 208 | 221 | 890 |
| " | 5 | " | 0.75 | — | 102 | 111 | — | — | 112 | 460 |
| " | 5 | " | 1.125 | — | 98 | 103 | — | — | 102 | 280 |
| TP319 (10 meq) | 5 | PCL-300 | 0.75 | Cloudy Gel | — | — | — | — | 159 | 50 |
| " | 5 | " | 1.5 | " | 155 | 265 | — | — | 214 | 240 |
| " | 5 | " | 2.25 | 2 Phase, gel + liquid | 135 | 191 | — | — | 250 | 490 |
| TP398 (10 meq) | 5 | " | 0.375 | — | 109 | 130 | 156 | 189 | 195 | 790 |
| " | 5 | " | 0.75 | — | — | — | — | — | 65 | 40 |
| " | 5 | " | 1.175 | — | — | — | — | — | 49 | 20 |
| TP319 (20 meq) | — | — | — | 2 Phase, gel + liquid | 190 | 430 | 1016 | — | 1213 | 530 |
| TP398 (10 meq) | — | — | — | — | 95 | 131 | 104 | 310 | 400 | 890 |

*PCL-A indicates that the PCL molecule is terminated by a tertiary amine group.
PCL-300 indicates that the PCL does not possess a terminal amine group and is about 10,000 in molecular weight.

What is claimed is:

1. A polymer complex of a metal neutralized sulfonated polymer and a polycaprolactone polymer said metal neutralized sulfonated polymer having about 3 to about 200 meq of metal neutralized sulfonate groups per 100 grams of said metal neutralized sulfonated polymer, said sulfonate groups being neutralized with a metal counterion selected from the Group consisting of Groups IA, IB, IIA, and IIB of the Periodic Table of Elements, said metal neutralized sulfonate groups being complexed with a polycaprolactone polymer having the formula:

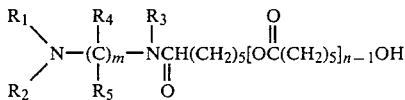

wherein $R_1$ or $R_2$ is an alkyl, cycloalkyl, heterocyclic or aryl group, $R_3$, $R_4$ and $R_5$ are a hydrogen or alkyl, cycloalkyl, or aryl groups, m equals 1 to 20 and n equals about 1 to about 500.

2. A polymer complex according to claim 1 wherein $R_1$ and $R_2$ are an alkyl group and $R_3$ is hydrogen.

3. A polymer complex according to claim 1 wherein either $R_1$ or $R_2$ is a methyl groups and $R_3$ is hydrogen.

4. A polymer complex according to claim 1 wherein $R_1$ and $R_2$ comprise components of a cyclic structure including multiring, or heterocyclic rings.

5. A polymer complex according to claim 1 wherein $R_1$ and $R_2$ are both methyl groups and $R_3$ is hydrogen.

6. A polymer complex according to claim 1 where $R_1$, $R_2$, and $R_3$ are methyl groups.

7. A polymer complex according to claim 1 wherein said neutralized sulfonated polymer is formed from an elastomeric polymer selected from the group consisting of Butyl rubber and an EPDM terpolymer.

8. A polymer complex according to claim 7 wherein said EPDM terpolymer consists essentially of about 40 to about 75 wt% of ethylene, of about 10 to abut 53 wt% of propylene and of about 12 to about 10 wt% of a nonconjugated diene.

9. A polymer complex according to claim 8 wherein said nonconjugated diene is selected from the group consisting of 1,4-hexadiene, dicyclopentadiene, 5-alkylidene-2-norbornenes, 5-alkenyl-2-norbornenes and tetrahydroindene.

10. A polymer complex according to claim 9 wherein said nonconjugated diene is 5-ethylidene-2-norbornene.

11. A polymer complex according to claim 1 wherein said sulfonated polymer is derived from a polymer selected from the group consisting of polystyrene, poly-t-butyl-styrene, polychlorostyrene and poly-alpha-methyl styrene.

12. A polymer complex according to claims 1, 6 or 10 further including about 25 to about 150 parts by weight of a nonpolar process oil per 100 parts of the sulfonated polymer, about 50 to about 300 parts by weight of a filler per 100 parts of the sulfonated polymer and at least about 3 parts by weight of a preferential plasticizer per 100 parts by weight of the sulfonated polymer.

13. A polymer complex according to claim 12, wherein said preferential plasticizer has a melting point of at least 25° C. and is selected from the group consisting of carboxylic acids having at least 8 carbon atoms, metallic salts of said carboxylic acids, urea, thioreas, amides, ammonium and amine salts of said carboxylic acids and amines and mixtures thereof.

14. A polymer complex according to claim 12, wherein said preferential plasticizer is a combination of a carboxylic acid and a metallic salt of said carboyxlic acid, a metal ion of said metallic salt being selected from the group consisting of aluminum, antimony, iron, lead and Groups IA, IIA, IB and IIB of the Periodic Table of Elements and mixtures thereof.

15. A polymer complex according to claim 12 wherein said filler is selected from the group consisting of clay, talc and calcium carbonate, and mixtures thereof.

16. A polymer complex according to claim 12, wherein said nonpolar process oil is selected from the group consisting of paraffinic, naphthenic and aromatics and mixtures thereof.

17. A polymer complex according to claim 1, wherein said metal counterion is zinc.

* * * * *